(12) United States Patent
Tokunaga et al.

(10) Patent No.: US 10,337,620 B2
(45) Date of Patent: Jul. 2, 2019

(54) SLIDING COMPONENT

(71) Applicant: EAGLE INDUSTRY CO., LTD., Minato-ku, Tokyo (JP)

(72) Inventors: Yuichiro Tokunaga, Tokyo (JP); Hideyuki Inoue, Tokyo (JP); Wataru Kimura, Tokyo (JP); Tetsuya Iguchi, Tokyo (JP); Keiichi Chiba, Tokyo (JP); Masatoshi Itadani, Tokyo (JP); Hikaru Katori, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/573,118

(22) PCT Filed: May 13, 2016

(86) PCT No.: PCT/JP2016/064249
§ 371 (c)(1),
(2) Date: Nov. 9, 2017

(87) PCT Pub. No.: WO2016/186020
PCT Pub. Date: Nov. 24, 2016

(65) Prior Publication Data
US 2018/0128378 A1 May 10, 2018

(30) Foreign Application Priority Data
May 21, 2015 (JP) .................................. 2015-103334

(51) Int. Cl.
*F16J 15/34* (2006.01)
*F02B 39/00* (2006.01)
*F16J 15/40* (2006.01)

(52) U.S. Cl.
CPC ............. *F16J 15/342* (2013.01); *F02B 39/00* (2013.01); *F16J 15/3412* (2013.01); *F16J 15/40* (2013.01)

(58) Field of Classification Search
CPC ...... F16J 15/34; F16J 15/3404; F16J 15/3408; F16J 15/3412; F16J 15/342; F16J 15/40; F02B 39/00
See application file for complete search history.

(56) References Cited

U.S. PATENT DOCUMENTS 3,675,935 A * 7/1972 Ludwig .................. F16J 15/342
277/400
3,804,424 A * 4/1974 Gardner ............... F16J 15/3412
277/360

(Continued)

FOREIGN PATENT DOCUMENTS

| JP | S6231775 A | 2/1987 |
| JP | S62117360 U | 7/1987 |

(Continued)

OTHER PUBLICATIONS

International Search Report (ISR) dated Aug. 2, 2016, issued for International application No. PCT/JP2016/064249.

*Primary Examiner* — Gilbert Y Lee
(74) *Attorney, Agent, or Firm* — Law Office of Katsuhiro Arai (57) ABSTRACT

In an embodiment, a sliding component includes a pair of sliding parts (a stationary-side seal ring 7 and a rotating-side seal ring 4) that relatively slide on each other and each have a sliding face S formed radially for sealing sealed fluid from leaking. The sliding face S of at least one sliding part is provided with dynamic pressure generation grooves 10 spaced in a non-communicating manner from the sealed-fluid side and the leakage side by lands R of both sliding faces, and is provided with fluid introduction holes 11 between leakage-side ends 10a of the grooves 10 and the (Continued)

leakage side, for communicating the grooves 10 and the leakage side. Each fluid introduction holes 11 is configured such that a dynamic-pressure-generation-groove-side opening 11*a* open to a corresponding one of the grooves 10 is axially displaced from a leakage-side opening 11*b* open to the leakage side.

20 Claims, 5 Drawing Sheets

(56) References Cited

U.S. PATENT DOCUMENTS

| | | | | |
|---|---|---|---|---|
| 4,071,253 | A * | 1/1978 | Heinen | F16J 15/342 |
| | | | | 277/369 |
| 6,076,830 | A * | 6/2000 | Wu | F16J 15/3488 |
| | | | | 277/387 |
| 6,135,458 | A * | 10/2000 | Fuse | F16J 15/342 |
| | | | | 277/382 |
| 6,494,460 | B2 * | 12/2002 | Uth | F16J 15/342 |
| | | | | 277/399 |
| 7,044,470 | B2 * | 5/2006 | Zheng | F16J 15/342 |
| | | | | 277/400 |
| 7,144,016 | B2 * | 12/2006 | Gozdawa | F16J 15/342 |
| | | | | 277/399 |
| 7,758,051 | B2 * | 7/2010 | Roberts-Haritonov | |
| | | | | F16J 15/342 |
| | | | | 277/400 |

FOREIGN PATENT DOCUMENTS

| JP | H01139174 U | 9/1989 |
|---|---|---|
| JP | 2001012610 A | 1/2001 |

* cited by examiner

SLIDING COMPONENT

This application is the U.S. National Phase under 35 U.S.C. § 371 of International Application PCT/JP2016/064249, filed May 13, 2016, which claims priority to Japanese Patent Application No. 2015-103334, filed May 21, 2015. The International Application was published under PCT Article 21(2) in a language other than English.

TECHNICAL FIELD

The present invention relates to sliding components suitable for, for example, mechanical seals, bearings, and other sliding units. In particular, the present invention relates to sliding components such as seal rings required to reduce friction by interposing fluid between sliding faces and prevent leakage of fluid from the sliding faces, e.g. oil seals used in gearboxes for turbochargers or for aircraft engines, or bearings.

BACKGROUND ART

A mechanical seal, an example of a sliding component, is evaluated in its performance by a leakage rate, a wear rate, and torque. In conventional techniques, by optimizing the sliding materials and the sliding face roughness of mechanical seals, their performance is increased to achieve low leakage, long life, and low torque. However, due to growing awareness of environmental problems in recent years, a further improvement in the performance of mechanical seals has been demanded, and technology development beyond the limits of the conventional techniques has been required.

Under such circumstances, as one used in an oil seal device for a rotating component such as a turbocharger, for example, a known one includes a rotating shaft rotatably placed in a housing, a disk-shaped rotor rotating with the rotating shaft, and a disk-shaped stator that is fixed to the housing and abuts on an end face of the rotor to prevent leakage of oil from the outer peripheral side to the inner peripheral side, the stator having an abutment face provided with an annular groove for generating positive pressure by the centrifugal force of fluid, to prevent leakage of oil from the outer peripheral side to the inner peripheral side (see Patent Document 1, for example).

Another known one in a rotating shaft seal device for sealing toxic fluid, for example, includes a rotating ring with a rotating shaft and a stationary ring mounted to a casing, one of the rotating ring and the stationary ring having a sliding face provided with spiral grooves with an end on the high-pressure side being in a dead-end shape, for drawing in liquid on the low-pressure side toward the high-pressure side by rotation of the rotating ring, to prevent leakage of sealed fluid on the high-pressure side to the low-pressure side (see Patent Document 2, for example).

Another known one as a face seal structure suitable for sealing a drive shaft of a turbocharger against a compressor housing, for example, has a pair of seal rings working together, one being provided as a rotating component and the other being provided as a stationary component, the seal rings each having a sliding face formed substantially radially, and forming, between the sliding faces, a seal gap for sealing an area provided outward of the sliding faces against an area provided inward of the sliding faces during operation, at least one of the sliding faces being provided with a plurality of circumferentially spaced recessed portions effective for feeding gas, the recessed portions extending from one peripheral edge of the sliding face toward the other peripheral edge, the recessed portions having an inner end radially spaced from the other peripheral edge of the sliding face, to seal a non-gas component in a gas medium containing the non-gas component (see Patent Document 3, for example).

CITATION LIST

Patent Documents

Patent Document 1: JP 62-117360 U
Patent Document 2: JP 62-31775 A
Patent Document 3: JP 2001-12610 A

SUMMARY OF THE INVENTION

Problem to be Solved by the Invention

Figure 5A:
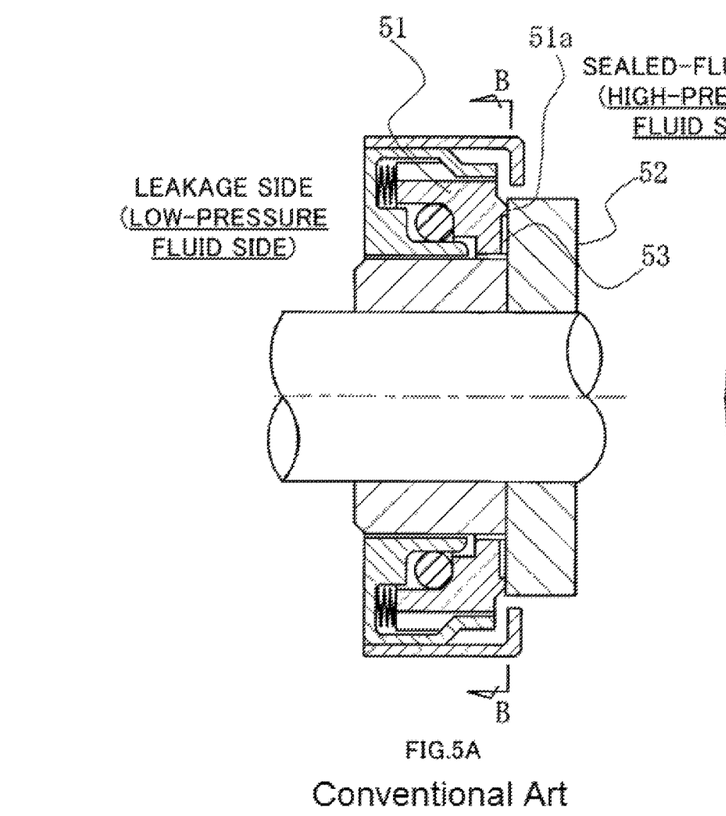
FIG. 5A is a vertical cross-sectional view.
Figure 5B:
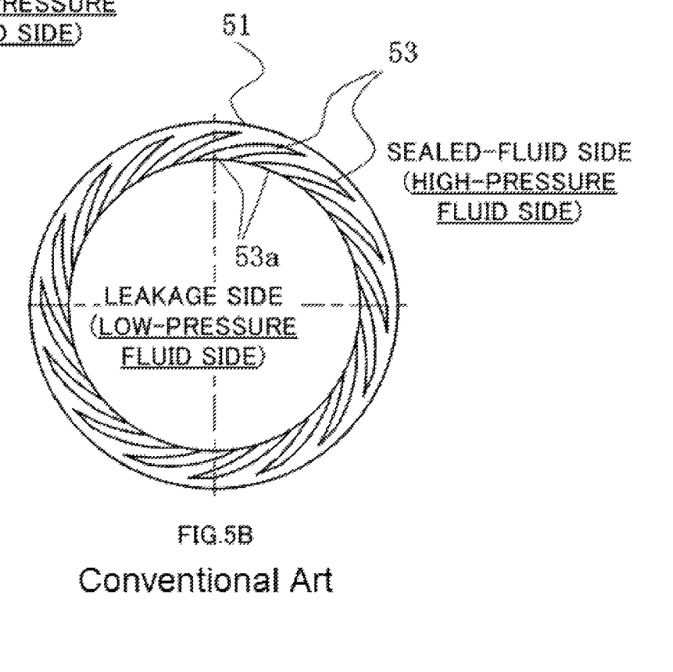
FIG. 5B is a cross-sectional view taken along arrow B-B.

However, in the conventional techniques described in Patent Documents 1 to 3 above, as shown in FIGS. 5A and 5B, for example, in a sliding face $51a$ of a stationary ring 51, leakage-side ends $53a$ of spiral grooves 53 for drawing fluid on the low-pressure fluid side (hereinafter, sometimes referred to as the "leakage side") toward the sealed-fluid side (high-pressure fluid side) by rotation of a rotating ring 52 are directly open to the leakage side, so that, near the openings, relative sliding of the sliding face of the stationary ring 51 and the sliding face of the rotating ring 52 can force dust to be drawn into the sliding faces. Dust drawn into the sliding faces is pulverized and micronized by their relative sliding to enter more easily between the sliding faces, disadvantageously promoting surface damage such as wear on the sliding faces.

The present invention has an object of providing a sliding component capable of improving both conflicting functions of sealing and lubrication of sliding faces of a pair of sliding parts sliding relatively by preventing leakage of sealed fluid and entry of dust into the sliding faces as well as fluid-lubricating the sliding faces for low friction during steady operation.

Means for Solving Problem

To attain the above object, a sliding component according to a first aspect of the present invention includes a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking. The sliding face of at least one sliding part of the pair of sliding parts is provided with dynamic pressure generation grooves spaced in a non-communicating manner from a sealed-fluid side and a leakage side by lands of both sliding faces, and is provided with fluid introduction holes between leakage-side ends of the dynamic pressure generation grooves and the leakage side, for communicating the dynamic pressure generation grooves and the leakage side. Each of the fluid introduction holes is configured such that a dynamic-pressure-generation-groove-side opening thereof open to a corresponding one of the dynamic pressure generation grooves is axially displaced from a leakage-side opening thereof open to the leakage side.

According to this aspect, the sliding component capable of improving both conflicting functions of sealing and lubrication of the sliding faces by preventing leakage of sealed fluid and entry of dust present in leakage-side fluid into the sliding faces as well as fluid-lubricating the sliding faces for low friction during steady operation can be provided. Further, since the dynamic pressure generation grooves are spaced from the sealed fluid by the lands, no leakage occurs during rest.

According to a second aspect of the present invention, a sliding component includes a pair of sliding parts that relatively slide on each other, one of the sliding parts being a stationary-side seal ring, the other of the sliding parts being a rotating-side seal ring, the seal rings each having a sliding face formed radially for sealing liquid or misty fluid, which is sealed fluid, from leaking. The sliding face of at least one sliding part of the pair of sliding parts is provided with dynamic pressure generation grooves spaced in a non-communicating manner from a sealed-fluid side and a leakage side by lands of both sliding faces, and is provided with fluid introduction holes between leakage-side ends of the dynamic pressure generation grooves and the leakage side, for communicating the dynamic pressure generation grooves and the leakage side. Each of the fluid introduction holes being configured such that a dynamic-pressure-generation-groove-side opening thereof open to a corresponding one of the dynamic pressure generation grooves is axially displaced from a leakage-side opening thereof open to the leakage side.

According to this aspect, the sliding component capable of improving both conflicting functions of sealing and lubrication of the sliding faces by preventing leakage of liquid, sealed fluid, and entry of dust present in leakage-side fluid into the sliding faces as well as fluid-lubricating the sliding faces for low friction during steady operation can be provided. Further, since the dynamic pressure generation grooves are spaced from the side of liquid, sealed fluid, by the lands, no leakage occurs during rest.

According to a third aspect of the present invention, in the sliding component according to the first or second aspect, the dynamic pressure generation grooves are spiral-shaped to suck fluid on the leakage side and pump the fluid toward the sealed-fluid side.

According to this aspect, during steady operation, the leakage-side fluid is pumped toward the sealed-fluid side, and the sealed fluid is prevented from leaking to the leakage side.

According to a fourth aspect of the present invention, in the sliding component according to any one of the first to third aspects, the dynamic-pressure-generation-groove-side opening and the leakage-side opening are communicated by a passage bent at a right angle.

According to this aspect, the entry of dust present in leakage-side fluid into the sliding faces can be further prevented.

According to a fifth aspect of the present invention, in the sliding component according to any one of the first to third aspects, the dynamic-pressure-generation-groove-side opening and the leakage-side opening are communicated by a passage inclined linearly.

According to this aspect, the entry of dust mixed in leakage-side fluid into the dynamic pressure generation grooves can be prevented, and processing to form the fluid introduction holes can be facilitated.

According to a sixth aspect of the present invention, in the sliding component according to any one of the first to third aspects, the dynamic-pressure-generation-groove-side opening and the leakage-side opening are communicated by a passage bent in an arc shape.

According to this aspect, the entry of dust present in leakage-side fluid into the sliding faces can be prevented, and the resistance of the fluid can be reduced.

According to a seventh aspect of the present invention, in the sliding component according to any one of the first to sixth aspects, each of the fluid introduction holes is disposed to be circumferentially inclined upstream from a side of the dynamic-pressure-generation-groove-side opening to a side of the leakage-side opening.

According to this aspect, the introduction of leakage-side fluid into the fluid introduction holes is facilitated, and the sucking of the fluid by the dynamic pressure generation grooves can be promoted.

According to an eighth aspect of the present invention, in the sliding component according to any one of the first to seventh aspects, the sliding face of at least one sliding part of the pair of sliding parts is provided with at least one fluid introduction groove configured to communicate with the sealed-fluid side and not to communicate with the leakage side.

According to this aspect, liquid present on the outer peripheral side of the sliding faces can be actively introduced into the sliding faces in a low-speed rotation state of the rotating-side seal ring such as at the time of startup, to lubricate the sliding faces.

Further, during high-speed rotation of the rotating-side seal ring such as during steady operation, liquid introduced into the sliding faces through the at least one fluid introduction groove is discharged by centrifugal force, and thus the liquid does not leak to the inner peripheral side, the leakage side.

Effects of the Invention

The present invention achieves the following outstanding effects.

(1) A sliding component includes a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking. The sliding face of at least one sliding part of the pair of sliding parts is provided with dynamic pressure generation grooves spaced in a non-communicating manner from a sealed-fluid side and a leakage side by lands of both sliding faces, and being provided with fluid introduction holes between leakage-side ends of the dynamic pressure generation grooves and the leakage side, for communicating the dynamic pressure generation grooves and the leakage side, each of the fluid introduction holes being configured such that a dynamic-pressure-generation-groove-side opening thereof open to a corresponding one of the dynamic pressure generation grooves is axially displaced from a leakage-side opening thereof open to the leakage side, so that the sliding component capable of improving both conflicting functions of sealing and lubrication of the sliding faces by preventing leakage of sealed fluid and entry of dust present in leakage-side fluid into the sliding faces as well as fluid-lubricating the sliding faces for low friction during steady operation can be provided. Further, since the dynamic pressure generation grooves are spaced from the sealed fluid by the lands, no leakage occurs during rest.

(2) A sliding component includes a pair of sliding parts that relatively slide on each other, one of the sliding parts being a stationary-side seal ring, the other of the sliding parts being a rotating-side seal ring, the seal rings each having a sliding face formed radially for sealing liquid or misty fluid, sealed fluid, from leaking, the sliding face of at least one sliding part of the pair of sliding parts being provided with dynamic pressure generation grooves spaced in a non-communicating manner from a sealed-fluid side and a leakage side by lands of both sliding faces, and being provided with fluid introduction holes between leakage-side ends of the dynamic pressure generation grooves and the leakage side, for communicating the dynamic pressure generation grooves and the leakage side, each of the fluid introduction holes being configured such that a dynamic-pressure-generation-groove-side opening thereof open to a corresponding one of the dynamic pressure generation grooves is axially displaced from a leakage-side opening thereof open to the leakage side, so that the sliding component capable of improving both conflicting functions of sealing and lubrication of the sliding faces by preventing leakage of liquid, sealed fluid, and entry of dust present in leakage-side fluid into the sliding faces as well as fluid-lubricating the sliding faces for low friction during steady operation can be provided. Further, since the dynamic pressure generation grooves are spaced from the side of liquid, sealed fluid, by the lands, no leakage occurs during rest.

(3) The dynamic pressure generation grooves are spiral-shaped to suck fluid on the leakage side and pump the fluid toward the sealed-fluid side, so that during steady operation, the leakage-side fluid is pumped toward the sealed-fluid side, and the sealed fluid is prevented from leaking to the leakage side.

(4) The dynamic-pressure-generation-groove-side opening and the leakage-side opening are communicated by a passage bent at a right angle, so that the entry of dust present in leakage-side fluid into the sliding faces can be further prevented.

(5) The dynamic-pressure-generation-groove-side opening and the leakage-side opening are communicated by a passage inclined linearly, so that the entry of dust mixed in leakage-side fluid into the dynamic pressure generation grooves can be prevented, and processing to form the fluid introduction holes can be facilitated.

(6) The dynamic-pressure-generation-groove-side opening and the leakage-side opening are communicated by a passage bent in an arc shape, so that the entry of dust present in leakage-side fluid into the sliding faces can be prevented, and the resistance of the fluid can be reduced.

(7) Each of the fluid introduction holes is disposed to be circumferentially inclined upstream from a side of the dynamic-pressure-generation-groove-side opening to a side of the leakage-side opening, so that the introduction of leakage-side fluid into the fluid introduction holes is facilitated, and the sucking of the fluid by the dynamic pressure generation grooves can be promoted.

(8) The sliding face of at least one sliding part of the pair of sliding parts is provided with at least one fluid introduction groove configured to communicate with the sealed-fluid side and not to communicate with the leakage side, so that liquid present on the outer peripheral side of the sliding faces can be actively introduced into the sliding faces in a low-speed rotation state of the rotating-side seal ring such as at the time of startup, to lubricate the sliding faces.

Further, during high-speed rotation of the rotating-side seal ring such as during steady operation, liquid introduced into the sliding faces through the at least one fluid introduction groove is discharged by centrifugal force, and thus the liquid does not leak to the inner peripheral side, the leakage side.

BRIEF DESCRIPTION OF THE DRAWINGS

FIGS. 5A and 5B are explanatory diagrams for explaining the conventional technique.

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise explicitly described.

First Embodiment

Figure 1:
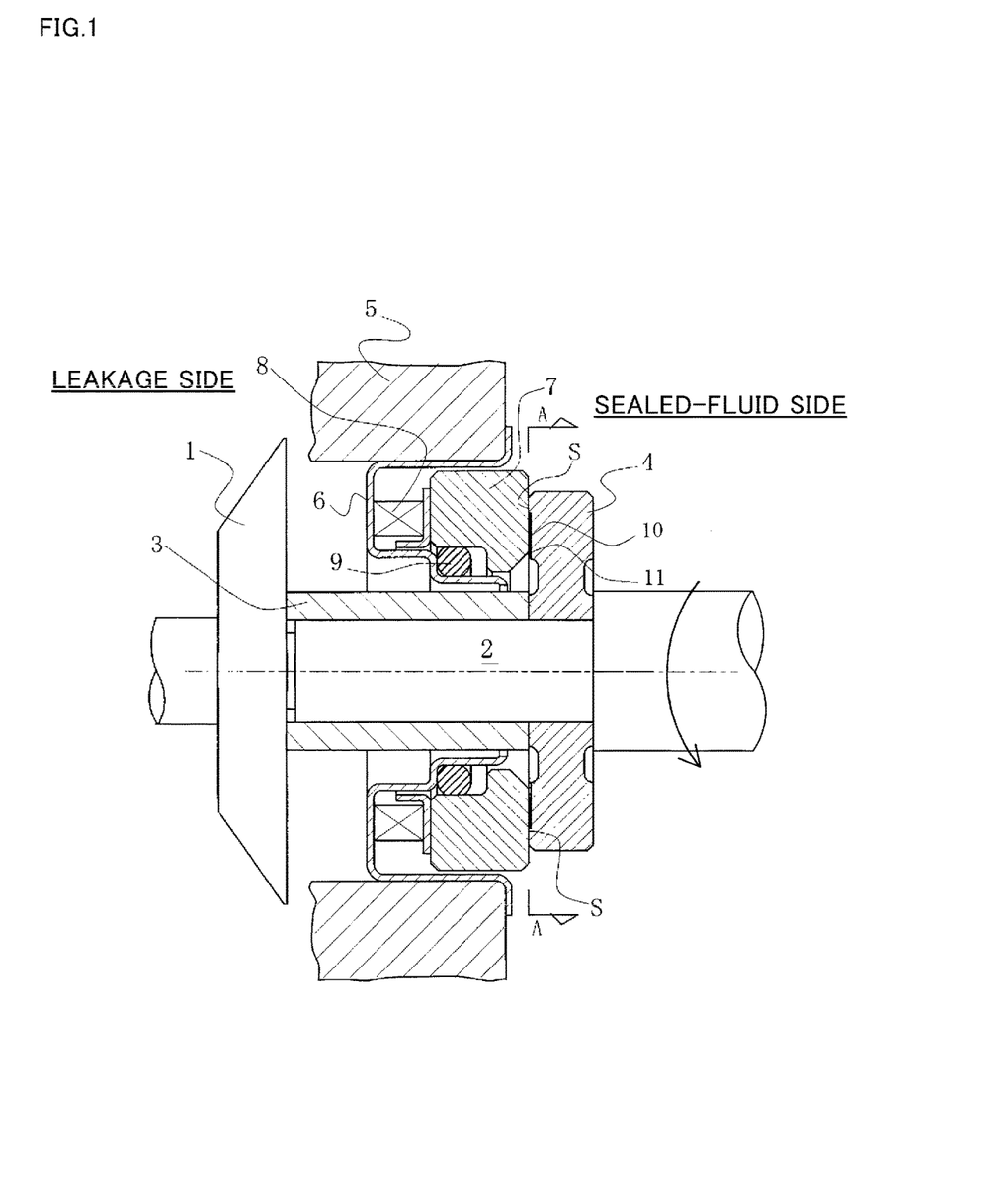
FIG. 1 is a vertical cross-sectional view showing an example of a mechanical seal according to a first embodiment of the present invention.
Figure 2A:
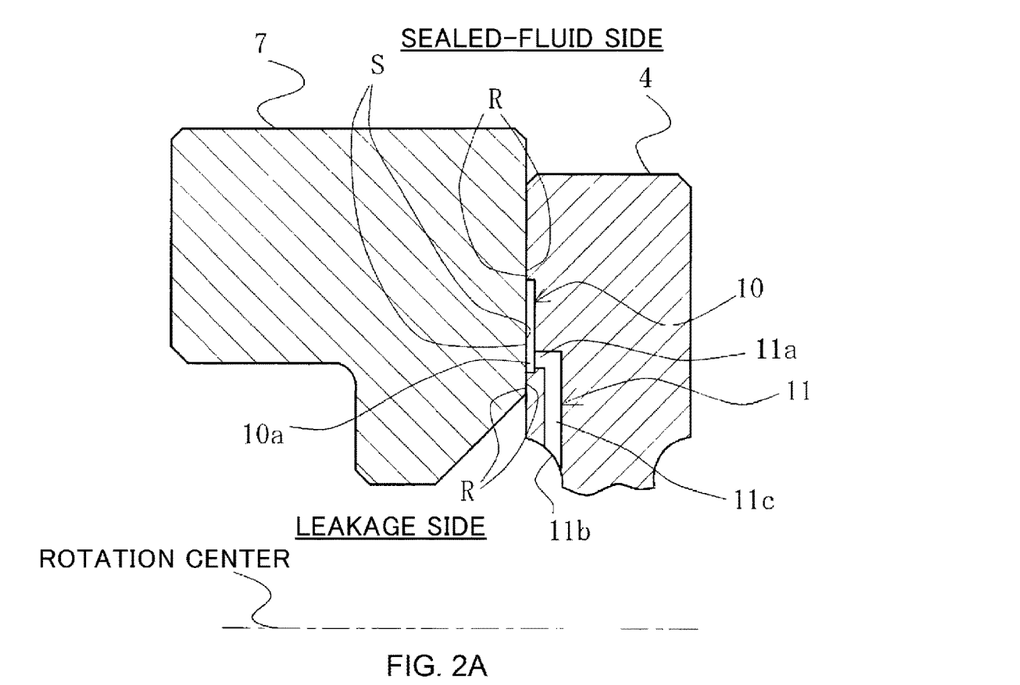
FIG. 2A shows an enlarged view of sliding portions of sliding parts according to the first embodiment of the present invention, with a horizontal rotation center positioned in a lower part of the sheet.
Figure 2B:
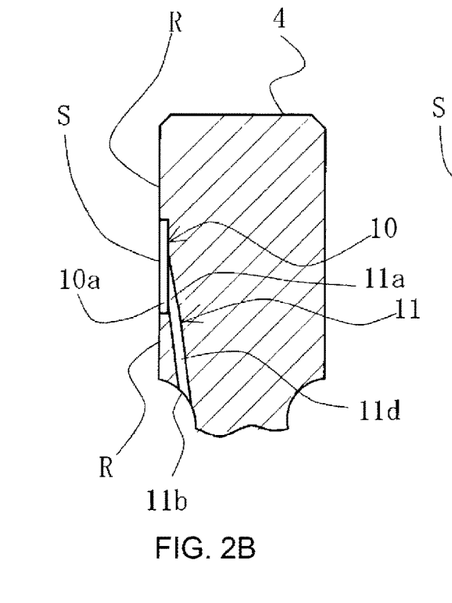
FIGS. 2B and 2C show modifications of a fluid introduction hole.
Figure 2C:
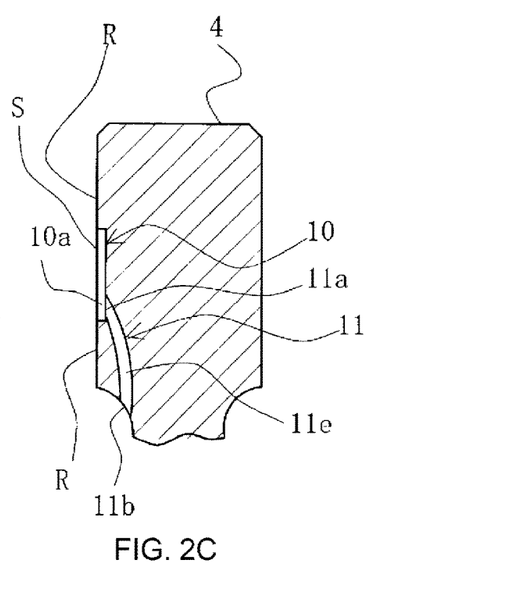
Figure 3:
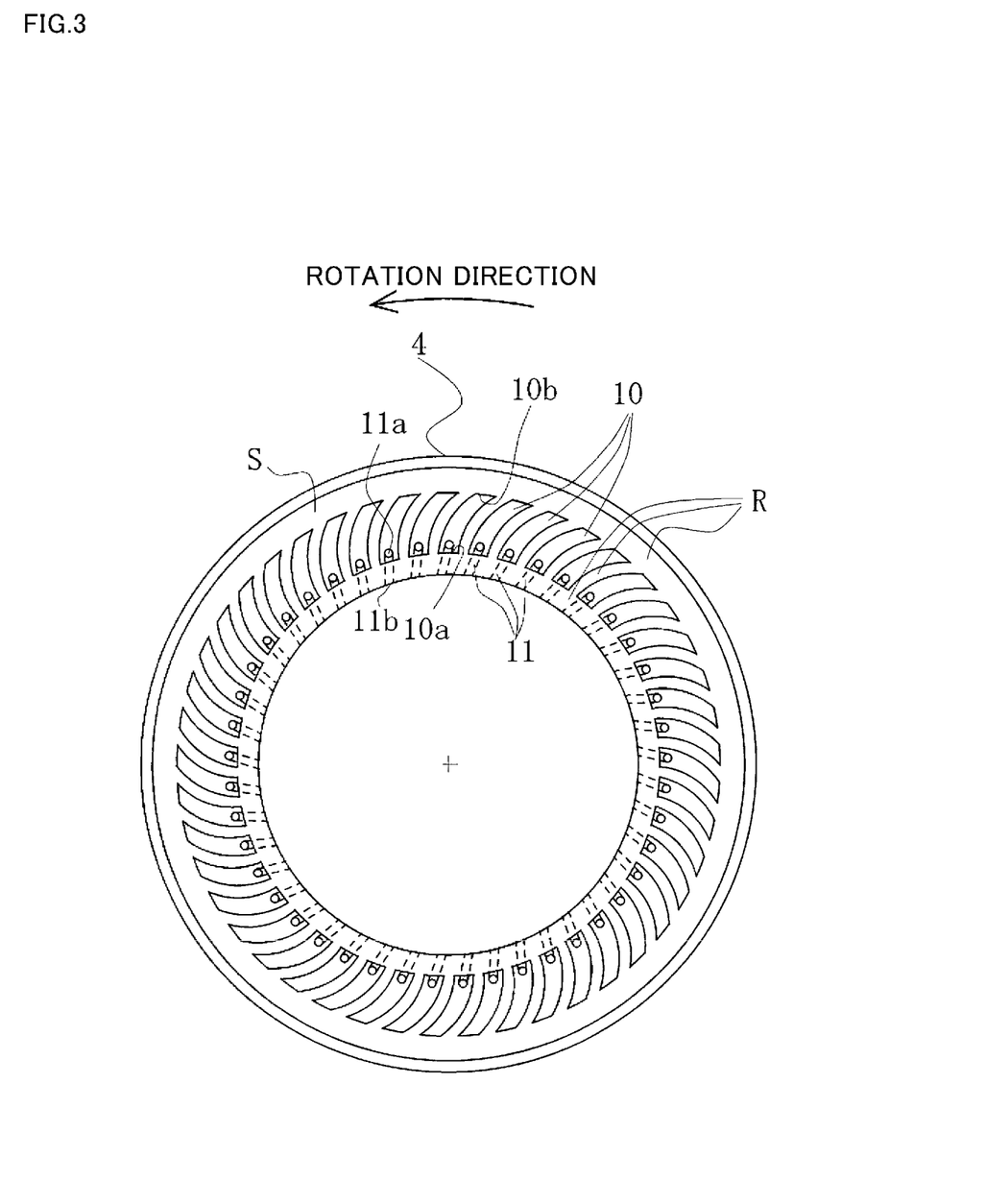
FIG. 3 is a cross-sectional view taken along arrow A-A in FIG. 1.

With reference to FIGS. 1 to 3, a sliding component according to a first embodiment of the present invention will be described.

In the following embodiments, a mechanical seal, an example of a sliding component, will be described as an example. The outer peripheral side of the sliding parts constituting a mechanical seal is described as a sealed-fluid side (liquid side or misty-fluid side), and the inner peripheral side as a leakage side (gas side). The present invention, however, is not limited to this, and is also applicable to a case where the outer peripheral side is a leakage side (gas side) and the inner peripheral side is a sealed-fluid side (liquid side or misty-fluid side). As for the pressure magnitude relationship between the sealed-fluid side (liquid side or misty-fluid side) and the leakage side (gas side), for example, the sealed-fluid side (liquid side or misty-fluid side) may be under a high pressure and the leakage side (gas side) under a low pressure, and vice versa, or both sides may be under the same pressure.

FIG. 1 is a vertical cross-sectional view showing an example of a mechanical seal, which is an inside mechanical seal in a form of sealing sealed fluid tending to leak from the outer periphery of sliding faces toward the inner periphery to leak, e.g. lubricating oil used for a bearing. The mechanical seal is provided, at a rotating shaft 2 to drive an impeller 1 of a compressor provided in a turbocharger, with a rotating-side seal ring 4 in an annular shape, one sliding part, provided in a state of being rotatable with the rotating shaft 2 in an integrated manner via a sleeve 3, and at a housing 5, with a stationary-side seal ring 7 in an annular shape, the other sliding part, provided in a non-rotating state and in an axially movable state via a cartridge 6. By a coiled wave spring 8 axially urging the stationary-side seal ring 7, the rotating-side seal ring 4 and the stationary-side seal ring 7 slide in close contact with each other on sliding faces S mirror-finished by lapping or the like. That is, in the mechanical seal, the rotating-side seal ring 4 and the stationary-side seal ring 7 each have the sliding face S formed radially, and prevent, at each other's sliding faces S, sealed fluid, e.g. liquid or misty fluid (hereinafter, liquid or misty fluid is sometimes referred to simply as "liquid") from flowing out from the outer periphery of the sliding faces S to the leakage side, the inner peripheral side.

Reference numeral 9 denotes an O-ring that seals a space between the cartridge 6 and the stationary-side seal ring 7.

In this example, the case where the sleeve 3 and the rotating-side seal ring 4 are separate is described, but the present invention is not limited to this. The sleeve 3 and the rotating-side seal ring 4 may be integrally formed.

The materials of the rotating-side seal ring 4 and the stationary-side seal ring 7 are selected from silicon carbide (SiC) excellent in wear resistance, carbon excellent in self-lubricity, and the like. For example, both may be SiC, or a combination of one of them being SiC and the other being carbon is possible.

FIG. 2 shows enlarged views of enlarged sliding portions of the sliding parts according to the first embodiment of the present invention.

In FIG. 2, the sliding face S of the rotating-side seal ring 4 is provided with dynamic pressure generation grooves 10 that are spaced in a non-communicating manner from the sealed-fluid side and the leakage side by lands R of the sliding faces of the rotating-side seal ring 4 and the stationary-side seal ring 7. That is, in this example, the dynamic pressure generation grooves 10 are provided only in the sliding face S of the rotating-side seal ring 4, the lands R are present radially on the leakage side and the sealed-fluid side of the dynamic pressure generation grooves 10, the sliding face S of the stationary-side seal ring 7 slides on the land R of the rotating-side seal ring 4, so that the dynamic pressure generation grooves 10 are spaced in a non-communicating manner from the sealed-fluid side and the leakage side. Specifically, the outer diameter on the sealed-fluid side of the sliding face S of the stationary-side seal ring 7 is set radially larger than sealed-fluid-side ends of the dynamic pressure generation grooves 10 in the rotating-side seal ring 4, and the inner diameter on the leakage side of the sliding face S of the stationary-side seal ring 7 is set radially smaller than leakage-side ends of the dynamic pressure generation grooves 10. The sliding face S of the stationary-side seal ring 7 slides on the land R of the rotating-side seal ring 4 on the inner-diameter side and the outer-diameter side of the dynamic pressure generation grooves 10, so that the dynamic pressure generation grooves 10 are spaced in a non-communicating manner from the sealed-fluid side and the leakage side.

Fluid introduction holes 11 for communicating the dynamic pressure generation grooves 10 and the leakage side are provided between leakage-side ends 10a of the dynamic pressure generation grooves 10 and the leakage side.

The cross-sectional shape of the fluid introduction holes 11, which is not limited to a particular one, is a circle, for example, and the hole diameter is desirably 0.5 mm or less. The cross-sectional shape of the dynamic pressure generation grooves 10 is a substantially rectangular shape.

As shown in FIG. 2, each fluid introduction hole 11 is configured such that a dynamic-pressure-generation-groove-side opening 11a that is open to the leakage-side end 10a of the dynamic pressure generation groove 10 is axially displaced from a leakage-side opening 11b that is open to the leakage side.

That is, each fluid introduction hole 11 is not configured to communicate the dynamic pressure generation groove 10 and the leakage side on a radial extension of the dynamic pressure generation groove 10 in the shortest distance from the dynamic pressure generation groove 10 directly to the leakage side, but is configured such that the dynamic-pressure-generation-groove-side opening 11a is axially displaced from the leakage-side opening 11b. The leakage-side opening 11b is provided in a position axially away from relatively sliding portions of the rotating-side seal ring 4 and the stationary-side seal ring 7, so that dust is not drawn by the relative sliding of the rotating-side seal ring 4 and the stationary-side seal ring 7, and the entry of dust mixed in fluid on the leakage side into the dynamic pressure generation groove 10 can be prevented.

In FIG. 2A, the dynamic-pressure-generation-groove-side opening 11a is communicated with the leakage-side opening 11b by a passage 11c bent at a right angle. The right-angled bend can further prevent the entry of dust mixed in leakage-side fluid into the dynamic pressure generation groove 10.

In FIG. 2B, the dynamic-pressure-generation-groove-side opening 11a is communicated with the leakage-side opening 11b by a passage 11d inclined linearly. The linearly inclined passage can prevent the entry of dust mixed in leakage-side fluid into the dynamic pressure generation groove 10 and can facilitate processing to form the fluid introduction hole 11.

In FIG. 2C, the dynamic-pressure-generation-groove-side opening 11a is communicated with the leakage-side opening 11b by a passage 11e bent in an arc shape. The arc-shaped bent passage 11e can prevent the entry of dust mixed in leakage-side fluid into the dynamic pressure generation groove 10 and can reduce the resistance of the fluid.

On the other hand, the dynamic pressure generation grooves 10 are for sucking leakage-side fluid and pumping the fluid toward the sealed-fluid side, and are spiral-shaped as shown in FIG. 3, for example.

The spiral dynamic pressure generation grooves 10 are communicated at the leakage-side ends 10a with the dynamic-pressure-generation-groove-side openings 11a of the fluid introduction holes 11, and are not at sealed-fluid-side ends 10b with the sealed-fluid side, and are inclined in a spiral form so as to exert a pumping action from the leakage-side ends 10a to the sealed-fluid-side ends 10b by relative sliding of the rotating-side seal ring 4 and the stationary-side seal ring 7, to generate dynamic pressure (positive pressure).

The spiral dynamic pressure generation grooves 10 are formed with a fixed groove width in FIG. 3. The groove width of the leakage-side ends 10a communicated with the dynamic-pressure-generation-groove-side openings 11a of the fluid introduction holes 11 may be increased, that is, the circumferential length of the ends 10a may be made longer than the other portions, to increase the effect of feeding fluid into the dynamic pressure generation grooves 10.

In a high-speed rotation state of the rotating-side seal ring 4 such as in steady operation, through the spiral dynamic pressure generation grooves 10, gas is sucked from the leakage side via the fluid introduction holes 11, generating dynamic pressure (positive pressure) near the sealed-fluid-side ends 10b, so that a slight gap is formed between the sliding faces S of the rotating-side seal ring and the stationary-side seal ring 7, and the sliding faces S are gas-lubricated to have very low friction.

In the present invention, the fluid introduction holes 11, which communicate the leakage side and the dynamic pressure generation grooves 10 as described above, are configured such that the dynamic-pressure-generation-groove-side openings 11a open to the dynamic pressure generation grooves 10 are axially displaced from the leakage-side openings 11b open to the leakage side, and the leakage-side openings 11b are provided in positions axially away from the relatively sliding portions of the rotating-side seal ring 4 and the stationary-side seal ring 7, so as to be able to prevent the entry of dust mixed in leakage-side fluid into the dynamic pressure generation grooves 10.

In the present invention, the fluid introduction holes are circumferentially inclined to facilitate the introduction of fluid as shown in FIG. 3. That is, the fluid introduction holes 11 are disposed to be inclined upstream from the side of the dynamic-pressure-generation-groove-side openings 11a to the side of the leakage-side openings 11b. The angle of inclination of the fluid introduction holes 11 in this case is determined according to the rotation speed (circumferential velocity) of the rotating-side seal ring 4, and is desirably set at an angle that allows leakage-side fluid to smoothly enter the spiral dynamic pressure generation grooves 10.

This disposition with upstream inclination from the side of the dynamic-pressure-generation-groove-side openings 11a to the side of the leakage-side openings 11b facilitates the introduction of leakage-side fluid into the fluid introduction holes 11 when the rotating-side seal ring 4 is rotated, and can promote the sucking of the fluid through the dynamic pressure generation grooves 10.

The configuration in the embodiment described above achieves the following effects.

(1) The sliding face S of at least one sliding part of the pair of sliding parts (the sliding face S of the rotating-side seal ring 4) is provided with the dynamic pressure generation grooves 10 spaced in a non-communicating manner from the side of liquid, sealed fluid, and the leakage side by the lands R of both sliding faces S, and is provided with the fluid introduction holes 11 communicating the dynamic pressure generation grooves 10 and the leakage side between the leakage-side ends 10a of the dynamic pressure generation grooves 10 and the leakage side, and the fluid introduction holes 11 are configured such that the dynamic-pressure-generation-groove-side openings 11a open to the dynamic pressure generation grooves 10 are axially displaced from the leakage-side openings 11b open to the leakage side, so that the sliding component capable of improving both conflicting functions of sealing and lubrication of the sliding faces by preventing leakage of liquid, sealed fluid, and entry of dust present in leakage-side fluid into the sliding faces as well as fluid-lubricating the sliding faces for low friction during steady operation can be provided. Further, since the dynamic pressure generation grooves are spaced from the side of liquid, sealed fluid, by the lands, no leakage occurs during rest.

(2) The dynamic pressure generation grooves 10 are spiral-shaped to suck fluid on the leakage side and pump the fluid toward the side of liquid, sealed fluid, so that during steady operation, the leakage-side fluid is pumped toward the side of liquid, sealed fluid, and the liquid, the sealed fluid, is prevented from leaking to the leakage side.

(3) The dynamic-pressure-generation-groove-side openings 11a and the leakage-side openings 11b of the fluid introduction holes 11 are communicated by the passages bent at a right angle, so that the entry of dust present in leakage-side fluid into the sliding faces can be further prevented.

(4) The dynamic-pressure-generation-groove-side openings 11a and the leakage-side openings 11b of the fluid introduction holes 11 are communicated by the linearly inclined passages, so that the entry of dust mixed in leakage-side fluid into the dynamic pressure generation grooves 10 can be prevented, and processing to form the fluid introduction holes 11 can be facilitated.

(5) The dynamic-pressure-generation-groove-side openings 11a and the leakage-side openings 11b of the fluid introduction holes 11 are communicated by the passages bent in an arc shape, so that the entry of dust present in leakage-side fluid into the sliding faces can be prevented, and the resistance of the fluid can be reduced.

(6) The fluid introduction holes 11, which are disposed to be circumferentially inclined upstream from the side of the dynamic-pressure-generation-groove-side openings 11a to the side of the leakage-side openings 11b, thus facilitate the introduction of leakage-side fluid into the fluid introduction holes 11, and can promote the sucking of the fluid by the dynamic pressure generation grooves 10.

Second Embodiment

Figure 4A:
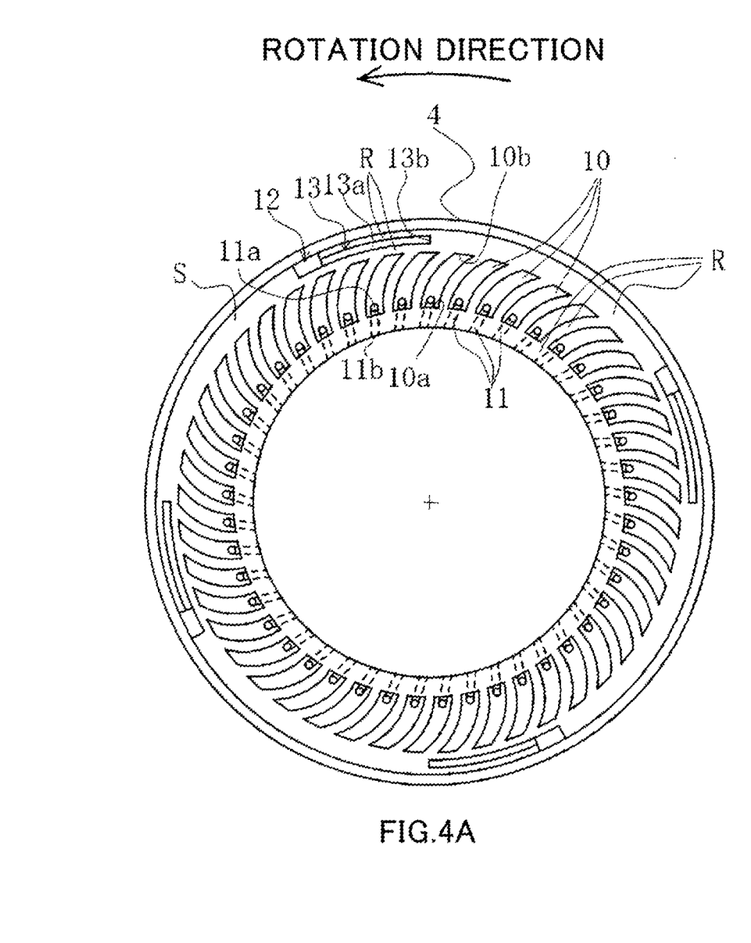
FIGS. 4A and 4B each show a sliding face of one sliding part of sliding parts according to a second embodiment of the present invention (FIGS. 4A and 4B are different in the shape of a fluid introduction groove).
Figure 4B:
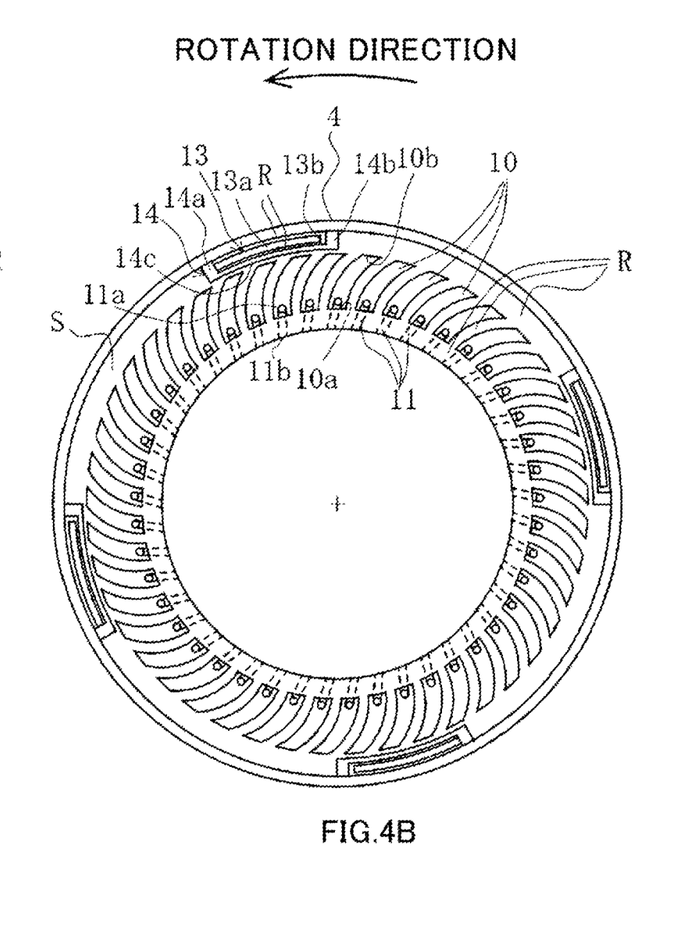

Next, with reference to FIGS. 4A and 4B, a sliding component according to a second embodiment of the present invention will be described (FIGS. 4A and 4B are different in the shape of a fluid introduction groove).

The sliding component according to the second embodiment is different from that in the above-described embodiment in that a sliding face of at least one sliding part of a pair of sliding parts is provided with at least one fluid introduction groove and at least one positive pressure generation mechanism, but the other basic configuration is identical to that in the above-described embodiment. The same members are provided with the same reference numerals and letters to omit redundant descriptions.

In FIG. 4A, a sliding face S of a rotating-side seal ring 4 is provided with fluid introduction grooves 12 configured to communicate with a peripheral edge the sliding face S on the sealed fluid side, i.e. the outer peripheral side, and not to communicate with a peripheral edge on the leakage side, i.e. the inner peripheral side.

At least one fluid introduction groove 12 is disposed along the peripheral edge on the outer peripheral side, formed in a substantially rectangular shape in planar shape, communicates with the sealed-fluid side at the peripheral edge of the sliding face S on the outer peripheral side, and is spaced from the inner peripheral side by a land R.

The sliding face S of the rotating-side seal ring 4 is further provided with positive pressure generation mechanisms 13 with positive pressure generation grooves 13a that communicate with circumferentially downstream ends of the fluid introduction grooves 12 and are shallower than the fluid introduction grooves 12. The positive pressure generation mechanisms 13 generate positive pressure (dynamic pressure), thereby increasing a fluid film between the sliding faces and improving lubrication performance.

The positive pressure generation grooves 13a communicate with the fluid introduction grooves 12 at their upstream ends, and are spaced from the outer peripheral side by the land R.

In this example, each positive pressure generation mechanism 13 is formed from a Rayleigh step mechanism having the positive pressure generation groove 13a communicating with the fluid introduction groove 12 at its upstream end and a Rayleigh step 13b, but is not limited to this. It is essential only that each be a mechanism generating positive pressure.

In FIG. 4A, a planar shape formed by the fluid introduction grooves 12 and the positive pressure generation mechanisms 13 is substantially an L shape.

Now, provided that the rotating-side seal ring 4 rotates in a counterclockwise direction, liquid on the outer peripheral side is introduced into the sliding faces from the substantially rectangular fluid introduction grooves 12, and the sliding faces S can be lubricated. At that time, the positive pressure generation mechanisms 13 generate positive pressure (dynamic pressure), so that a fluid film between the sliding faces is increased, and lubrication performance can be further improved.

Further, the liquid introduced into the sliding faces from the fluid introduction grooves 12 is discharged by centrifugal force during high-speed rotation of the rotating-side seal ring 4 such as during steady operation, so that the liquid does not leak to the inner peripheral side, the leakage side.

FIG. 4B is different from FIG. 4A in that the shape of fluid introduction grooves is different, but otherwise identical to FIG. 4A.

In FIG. 4B, a sliding face S of a rotating-side seal ring 4 is provided with fluid introduction grooves 14 configured to communicate with a peripheral edge the sliding face S on the sealed fluid side, i.e. the outer peripheral side, and not to communicate with a peripheral edge on the leakage side, i.e. the inner peripheral side.

Each fluid introduction groove 14 is disposed along the peripheral edge on the outer peripheral side, is formed of a fluid introduction portion 14a and a fluid discharge portion 14b that communicate only with the peripheral edge of the sliding face S on the outer peripheral side, and a fluid communication portion 14c that communicates them circumferentially, and is spaced from the inner peripheral side by a land R.

In this example, the fluid introduction portion 14a and the fluid discharge portion 14b are circumferentially spaced at a certain distance, each extending radially linearly, and thus the fluid introduction groove 14 is substantially U-shaped in planar shape.

Positive pressure generation mechanisms 13 with positive pressure generation grooves 13a shallower than the fluid introduction grooves 14 are provided in portions enclosed by the fluid introduction grooves 14 and the outer peripheral side. The positive pressure generation mechanisms 13 generate positive pressure (dynamic pressure), thereby increasing a fluid film between the sliding faces and improving lubrication performance.

Each positive pressure generation groove 13a communicates with the fluid introduction portion 14a at its upstream end, and is spaced from the fluid discharge portion 14b and the outer peripheral side by the land R.

In this example, each positive pressure generation mechanism 13 is formed from a Rayleigh step mechanism having the positive pressure generation groove 13a communicating at its upstream end with the fluid introduction portion 14a of the fluid introduction groove 14 and a Rayleigh step 13b, but is not limited to this. It is essential only that each be a mechanism generating positive pressure.

Now, provided that the rotating-side seal ring 4 rotates in a counterclockwise direction, liquid on the outer peripheral side is introduced into the sliding faces from the fluid introduction portions 14a of the substantially U-shaped fluid introduction grooves 14, and discharged to the outer peripheral side from the fluid discharge portions 14b. At that time, the liquid present on the outer peripheral side of the sliding faces S can be actively introduced into the sliding faces S in a low-speed rotation state of the rotating-side seal ring 4 such as at the time of startup, to lubricate the sliding faces S. At that time, the positive pressure generation mechanisms 13 generate positive pressure (dynamic pressure), so that a fluid film between the sliding faces is increased, and lubrication performance can be further improved.

During high-speed rotation of the rotating-side seal ring 4 such as during steady operation, liquid introduced into the sliding faces through the fluid introduction grooves 14 is discharged by centrifugal force, and thus the liquid does not leak to the inner peripheral side, the leakage side.

In FIG. 4B, the fluid introduction grooves 14 are formed substantially in a U shape in planar shape, but are not limited to this. They may be formed in a shape in which the fluid introduction portions 14a and the fluid discharge portions 14b converge on the inner-diameter side, i.e. substantially a V shape.

The configuration in the second embodiment described above achieves the following effects in addition to the effects in the first embodiment.

The sliding face S of the rotating-side seal ring 4 is provided with the fluid introduction grooves 12 or 14 configured to communicate with the peripheral edge of the sliding face S on the sealed fluid side, i.e. the outer peripheral side, and not to communicate with the peripheral edge on the leakage side, i.e. the inner peripheral side, so that liquid present on the outer peripheral side of the sliding faces S can be actively introduced into the sliding faces S in a low-speed rotation state of the rotating-side seal ring 4 such as at the time of startup, to lubricate the sliding faces S. At that time, the positive pressure generation mechanisms 13 generate positive pressure (dynamic pressure), so that a fluid film between the sliding faces is increased, and lubrication performance can be further improved.

Further, during high-speed rotation of the rotating-side seal ring 4 such as during steady operation, liquid introduced into the sliding faces through the fluid introduction grooves 12 or 14 is discharged by centrifugal force, and thus the liquid does not leak to the inner peripheral side, the leakage side.

Although the embodiments of the present invention have been described above with reference to the drawings, a specific configuration is not limited to these embodiments. Any changes and additions made without departing from the scope of the present invention are included in the present invention.

For example, although the above embodiments have described the example where the sliding part is used as one of a pair of a rotating seal ring and a stationary seal ring in a mechanical seal device, it can also be used as a bearing sliding part that slides on a rotating shaft while sealing lubricating oil against axially one side of a cylindrical sliding face.

Further, for example, although the above embodiments have described the outer peripheral side of the sliding part as the sealed-fluid side (liquid side or misty-fluid side), and the inner peripheral side as the leakage side (gas side), the present invention is not limited to this. The present invention is also applicable to a case where the outer peripheral side is the leakage side (gas side), and the inner peripheral side is the sealed-fluid side (liquid side or misty-fluid side). As for the pressure magnitude relationship between the sealed-fluid side (liquid side or misty-fluid side) and the leakage side (gas side), for example, the sealed-fluid side (liquid side or misty-fluid side) may be under a high pressure and the leakage side (gas side) under a low pressure, and vice versa, or both sides may be under the same pressure.

Further, for example, the above embodiments have described the case where the dynamic pressure generation grooves 10 are spiral grooves, but the present invention is not limited to this. Each may be a combination of a Rayleigh step and a reverse Rayleigh step. It is essential only that each be a mechanism generating dynamic pressure (positive pressure) by sucking fluid on the leakage side.

Further, for example, the above embodiments have described the case where the dynamic pressure generation grooves 10 and the fluid introduction holes 11 are provided in the rotating-side seal ring 4, but the present invention is not limited to this. They may be provided in the stationary-side seal ring 7.

REFERENCE SIGN LIST 1 impeller
2 rotating shaft
3 sleeve
4 rotating-side seal ring
5 housing
6 cartridge
7 stationary-side seal ring
8 coiled wave spring
10 dynamic pressure generation groove
10a leakage-side end
10b sealed-fluid-side end
11 fluid introduction hole
11a dynamic-pressure-generation-groove-side opening
11b leakage-side opening
12 fluid introduction groove
13 positive pressure generation mechanism
14 fluid introduction groove
S sliding face
R land

The invention claimed is:

1. A sliding component comprising a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking, wherein
the sliding face of at least one sliding part of the pair of sliding parts is provided with dynamic pressure generation grooves spaced in a non-communicating manner from a sealed-fluid side and a leakage side by lands of both sliding faces, and is provided with fluid introduction holes between leakage-side ends of the dynamic pressure generation grooves and the leakage side, for communicating the dynamic pressure generation grooves and the leakage side, and
each fluid introduction hole has:
a leakage-side opening open to and communicating with the leakage side in proximity to the sliding face for taking in fluid on the leakage side therethrough to the fluid introduction hole, and
a dynamic-pressure-generation-groove-side opening open to the corresponding dynamic pressure generation groove for discharging the fluid on the leakage side therethrough from the fluid introduction hole to the dynamic pressure generation groove,
wherein the dynamic-pressure-generation-groove-side opening is axially displaced from the leakage-side opening.

2. The sliding component according to claim 1, wherein the dynamic pressure generation grooves are spiral-shaped to suck the fluid on the leakage side and pump the fluid toward the sealed-fluid side.

3. The sliding component according to claim 2, wherein the dynamic-pressure-generation-groove-side opening and the leakage-side opening are communicated by a passage bent at a right angle.

4. The sliding component according to claim 2, wherein the dynamic-pressure-generation-groove-side opening and the leakage-side opening are communicated by a passage inclined linearly.

5. The sliding component according to claim 2, wherein the dynamic-pressure-generation-groove-side opening and the leakage-side opening are communicated by a passage bent in an arc shape.

6. The sliding component according to claim 2, wherein each of the fluid introduction holes is disposed to be circumferentially inclined upstream from a side of the dynamic-pressure-generation-groove-side opening to a side of the leakage-side opening.

7. The sliding component according to claim 2, wherein the sliding face of at least one sliding part of the pair of sliding parts is provided with at least one fluid introduction groove configured to communicate with the sealed-fluid side and not to communicate with the leakage side.

8. The sliding component according to claim 1, wherein the dynamic-pressure-generation-groove-side opening and the leakage-side opening are communicated by a passage bent at a right angle.

9. The sliding component according to claim 8, wherein each of the fluid introduction holes is disposed to be circumferentially inclined upstream from a side of the dynamic-pressure-generation-groove-side opening to a side of the leakage-side opening.

10. The sliding component according to claim 1, wherein the dynamic-pressure-generation-groove-side opening and the leakage-side opening are communicated by a passage inclined linearly.

11. The sliding component according to claim 1, wherein the dynamic-pressure-generation-groove-side opening and the leakage-side opening are communicated by a passage bent in an arc shape.

12. The sliding component according to claim 1, wherein each of the fluid introduction holes is disposed to be circumferentially inclined upstream from a side of the dynamic-pressure-generation-groove-side opening to a side of the leakage-side opening.

13. The sliding component according to claim 1, wherein the sliding face of at least one sliding part of the pair of sliding parts is provided with at least one fluid introduction groove configured to communicate with the sealed-fluid side and not to communicate with the leakage side.

14. A sliding component comprising a pair of sliding parts that relatively slide on each other, one of the sliding parts being a stationary-side seal ring, the other of the sliding parts being a rotating-side seal ring, the seal rings each having a sliding face formed radially for sealing liquid or misty fluid, which is sealed fluid, from leaking, wherein
the sliding face of at least one sliding part of the pair of sliding parts is provided with dynamic pressure generation grooves spaced in a non-communicating manner from a sealed-fluid side and a leakage side by lands of both sliding faces, and is provided with fluid introduction holes between leakage-side ends of the dynamic pressure generation grooves and the leakage side, for communicating the dynamic pressure generation grooves and the leakage side, and
each fluid introduction hole has:
a leakage-side opening open to and communicating with the leakage side in proximity to the sliding face for taking in fluid on the leakage side therethrough to the fluid introduction hole, and
a dynamic-pressure-generation-groove-side opening open to the corresponding dynamic pressure generation groove for discharging the fluid on the leakage side therethrough from the fluid introduction hole to the dynamic pressure generation groove, wherein the dynamic-pressure-generation-groove-side opening is axially displaced from the leakage-side opening.

15. The sliding component according to claim 14, wherein the dynamic pressure generation grooves are spiral-shaped to suck the fluid on the leakage side and pump the fluid toward the sealed-fluid side.

16. The sliding component according to claim 14, wherein the dynamic-pressure-generation-groove-side opening and the leakage-side opening are communicated by a passage bent at a right angle.

17. The sliding component according to claim 14, wherein the dynamic-pressure-generation-groove-side opening and the leakage-side opening are communicated by a passage inclined linearly.

18. The sliding component according to claim 14, wherein the dynamic-pressure-generation-groove-side opening and the leakage-side opening are communicated by a passage bent in an arc shape.

19. The sliding component according to claim 14, wherein each of the fluid introduction holes is disposed to be circumferentially inclined upstream from a side of the dynamic-pressure-generation-groove-side opening to a side of the leakage-side opening.

20. The sliding component according to claim 14, wherein the sliding face of at least one sliding part of the pair of sliding parts is provided with at least one fluid introduction groove configured to communicate with the sealed-fluid side and not to communicate with the leakage side.

\* \* \* \* \*